United States Patent Office 2,800,517
Patented July 23, 1957

2,800,517

PROCESS FOR MANUFACTURING BUTADIENE

Cyril Romanovsky, Bristol, and Thomas Earl Jordan, Philadelphia, Pa., assignors to Publicker Industries Inc., Philadelphia, Pa., a corporation of Pennsylvania No Drawing. Application June 26, 1953,
Serial No. 364,519

12 Claims. (Cl. 260—681)

This invention is directed to a process useful for the direct catalytic conversion of ethyl alcohol to butadiene and to a method for the preparation of such catalyst.

It has been known for many years that butadiene (1,3 butadiene) a raw material in the manufacture of synthetic rubber can be obtained from ethyl alcohol. The relatively high price of ethyl alcohol, however, has rendered the commercial utilization of processes for the manufacture of butadiene from ethyl alcohol costly in comparison with the cost of butadiene obtained from other sources, such as from butene fractions derived from petroleum refineries.

In order to render such direct alcohol conversion processes commercially competitive, the development of catalysts having high activity and selectivity and consequently a high degree of alcohol conversion and yield of butadiene is necessary. Among the most active and selective of the catalysts heretofore developed for this purpose is the magnesia-silica type catalyst (see Szukiewicz Patent 2,357,855).

This invention has as an object the provision of an improved process for the direct catalytic conversion of ethyl alcohol to butadiene.

This and other objects are accomplished by the process of our invention which comprises contacting ethyl alcohol at an elevated temperature with a catalyst comprising a major weight percentage of magnesia and silica (preferably the magnesia being present in a greater weight percentage than the silica) and a minor weight percentage sufficient to confer improved catalytic conversion characteristics for catalyzing the direct conversion of ethyl alcohol to butadiene of a phosphate of calcium, most preferably dibasic calcium phosphate ($CaHPO_4$) or tricalcium phosphate ($Ca_3(PO_4)_2$). Preferably the phosphate of calcium should be present in the catalyst in a concentration of from about 1–35 weight percent and most preferably in a concentration of about 5–25 weight percent. A catalyst consisting essentially of about 55–80 weight percent of magnesia, about 15–40 weight percent of silica and from about 5–25 weight percent of either dibasic calcium phosphate or tricalcium phosphate constitutes the most preferred embodiment in the process of our invention.

When the catalyst comprises dibasic calcium phosphate, the process of our invention is preferably effected with a dilute solution of ethyl alcohol, such as one containing about 35–50 weight percent of alcohol, 3–10 weight percent of acetaldehyde and 40–60 weight percent of water.

Our method for manufacturing such catalyst comprises commingling a minor weight percentage of the phosphate of calcium with a major weight percentage of magnesia and silica to form a substantially homogeneous mixture having improved catalytic conversion characteristics for catalyzing the direct conversion of ethyl alcohol to butadiene. Preferably, this commingling is effected by dry blending the phosphate with a major weight percentage of magnesia and silica to form a mixture, subsequently adding water to this mixture to form a hydration mass, homogenizing this hydration mass and then drying the homogenized hydration mass and forming catalyst particles therefrom.

The most advantageous method of preparing the catalyst is effected by dry blending pulverized magnesia, silica and the phosphate of calcium in correct proportions and then adding a relatively large volume of water to the dry-blended mixture to form a hydration mass. The hydration mass is homogenized by thorough mechanical agitation and is formed into a cake which can be set at room temperature. Subsequently the cake is dried and pulverized or pelleted into suitably sized catalyst particles or pellets.

While the aforementioned method of catalyst preparation involving the formation of a hydration mass is to be preferred, the phosphate of calcium in the form of particles can be homogeneously commingled with a particulated magnesia-silica catalyst to form the catalyst of our invention.

As heretofore indicated, the preferred catalysts for the process of our invention comprise about 65–99 weight percent of magnesia and silica and about 1–35 weight percent of the phosphate of calcium. As heretofore indicated, the magnesia should be present in greater weight percentage than the silica, the preferred magnesia silica weight percentage being about 3–4:1, although improved results can be secured with catalysts having magnesia and silica present in the ratio of between about 50–80 parts by weight of magnesia and about 10–40 parts by weight of silica. The most preferred weight percentage for the phosphate of calcium in the catalyst is about 5–25 weight percent. The most preferred catalyst compositions for the process of our invention comprise catalysts containing 55–80 weight percent of magnesia, 15–40 weight percent of silica and 5–25 weight percent of dibasic calcium phosphate or tricalcium phosphate, with the optimum catalysts for many purposes comprising about 70 weight percent magnesia, about 20 weight percent silica and about 10 weight percent of dibasic calcium phosphate or tricalcium phosphate.

The preferred catalysts for the process of our invention consist essentially of magnesia, silica and the phosphate of calcium. However, minor amounts of additional promoters such as chromium oxide, graphite, etc. can be present. The addition of such promoters is normally not necessary, and in fact in most cases does not improve the utility of the catalyst.

The embodiment of our invention comprising a process employing a tricalcium phosphate-magnesia-silica catalyst is of maximum commercial utility for the direct conversion of concentrated ethyl alcohol feeds to butadiene. Thus, this catalyst possesses a high degree of activity and a relatively high degree of selectivity for the conversion of feeds comprising concentrated alcohol solutions such as S. D. A. 29, a mixture consisting of 100 parts by volume of 95% ethanol and 1 part by volume of acetaldehyde. This catalyst can also be successfully utilized with moderately concentrated alcohol feeds such as a feed consisting of 70 weight percent alcohol, 10 weight percent acetaldehyde and 20 weight percent water. However, with such moderately concentrated feeds the activity of the catalyst is noticeably reduced without a fully satisfactory compensating increase in the selectivity. This results in a reduction in the conversion of alcohol to butadiene which can be achieved in a given size industrial unit. This embodiment of the catalyst for the process of our invention therefore achieves its optimum commercial utility when the cost of industrial concentrated alcohol is relatively low since this catalyst secures a high rate of conversion and a relatively high selectivity with concentrated alcohol mixtures.

However, the embodiment of our invention comprising a process employing dibasic calcium-phosphate-magnesia-silica catalyst is to be preferred in periods when the cost of concentrated industrial alcohol is relatively high. This catalyst has a very high selectively for the conversion of alcohol to butadiene provided that dilute alcohol mixtures are utilized as the feed. Thus, while this catalyst can be utilized with concentrated alcohol feeds it achieves its optimum degree of utility when utilized with dilute alcohol mixtures such as mixtures consisting of 35–50 weight percent of alcohol, 3–10 weight percent of acetaldehyde and 40–60 weight percent of water. A feed mixture consisting of about 44 weight percent of alcohol, 6 weight percent of acetaldehyde and 50 weight percent of water has been found to be most useful under many conditions.

The use of dilute alcohol mixtures as a feed results in a lower overall conversion of feed per unit of reactor capacity per unit of time, but produces a higher overall yield of butadiene per given amount of alcohol due to the greater degree of selectivity per unit of feed charged to the reactor. The relatively low overall conversion rate can be at least partially compensated for by increasing the throughput, since at higher throughputs a larger overall yield of butadiene per unit of reactor capacity per unit of time can be achieved.

The operative reaction temperatures heretofore utilized with magnesia-silica catalysts for effecting the direct conversion of ethyl alcohol to butadiene can be employed for the process of our invention. However, the preferred reaction temperature for effecting this conversion is a temperature within the range of about 350–450° C. With the catalyst comprising dibasic calcium phosphate the most preferred temperature is 375–420° C., with the optimum range being about 390–400° C. Under these optimum conditions, a space velocity of the order of 0.5–0.7 volumes of feed per volume of catalyst per hour can advantageously be used. With the catalyst comprising tricalcium phosphate the preferred temperature range is 390–420° C., with 400–410° C. being most preferred, and an optimum space velocity of 0.4–0.6 volume of feed per volume of catalyst per hour. However, the space velocity can be varied in conjunction with the size of the catalyst particles, the reaction temperature, the spatial configuration of the conversion unit, etc. The preferred reaction pressure is a pressure approximating atmospheric pressure although of course other pressures can be used, if desired.

An example of the preparation of the catalyst for the process of our invention is as follows:

Five hundred parts by weight of magnesia (Neoprene grade, supplied by the General Magnesite Co.), 200 parts by weight of Magnesol (a magnesium silicate having a weight ratio of 21 percent magnesia and 79 percent silica supplied by the Westvaco Co.) and 80 parts by weight of dibasic calcium phosphate were dry blended for a period of 15 minutes in a commercial dry blender, such as a Readco dough mixer. Fourteen hundred parts by weight of distilled water were added with continuous mixing over a period of several minutes. After the addition of the water was completed, mechanical agitation was temporarily discontinued and any material adhering to the walls of the mixing vessel was worked into the hydration mass. The agitation of the hydration mass was then resumed for a lengthy time interval so that the hydration mass was ultimately worked into a thick smooth paste.

The paste was transferred to a transite board and formed into a 1-inch thick cake. This cake was divided into 1-inch cubes and allowed to set at room temperature for one-half hour. Subsequent to the setting, the cake was dried at 110° C. for a period of 18 hours. The dry catalyst cubes were then pulverized, sieved to retain suitably sized particles, and pelleted by means of a pill machine to form catalyst pellets. Sufficient moisture (about 10 weight percent water) was retained so that the use of a lubricant to form pellets or pills of the order of ¼-inch cylinders was not necessary.

The advantages achieved through the use of the process of our invention is evident from an examination of the following table which reveals the degree of alcohol conversion and the butadiene, butene and ethylene yield when a feed comprising 43.8 weight percent alcohol, 6.2 weight percent acetaldehyde and 50 weight percent water, except as indicated by the footnote(*) in run No. 451 where the feed comprised S.D.A. 29, was contacted with the catalyst compositions and the temperature and feed rate conditions set forth below.

| run | catalyst compositions in weight percent | feed rate, ml. of feed per liter of catalyst per hour | reaction temp., ° C. | wt. percent conversion of feed | wt. percent butadiene yield | wt. percent butylene yield | wt. percent ethylene yield |
|---|---|---|---|---|---|---|---|
| 508 | 77.2—MgO, 22.8—SiO₂ | 600 | 390 | 20 | 25 | 10 | 1 |
| 492 | 79.9—MgO, 20.1—SiO₂ | 600 | 390 | 14 | 33 | 9 | 0 |
| 481 | 67.9—MgO, 20.1—SiO₂, 12.0—CaHPO₄ | 600 | 390 | 29 | 36.5 | 7.0 | 1.5 |
| 486 | 67.9—MgO, 20.1—SiO₂, 12.0—CaHPO₄ | 600 | 390 | 23 | 41 | 10 | 2.5 |
| 489 | 60.7—MgO, 17.9—SiO₂, 10.7—CaHPO₄, 10.7 CuO | 600 | 390 | 20.2 | 40 | 14.1 | 0.1 |
| 509 | 66.6—MgO, 22.0—SiO₂, 11.4—CaHPO₄ | 600 | 390 | 25 | 40 | 6 | 4 |
| 509 | 66.6—MgO, 22.0—SiO₂, 11.4—CaHPO₄ | 1,000 | 400 | 22 | 35 | 6 | 4 |
| 509 | 66.6—MgO, 22.0—SiO₂, 11.4—CaHPO₄ | 400 | 400 | 38 | 33 | 7 | 4 |
| 451 | 69.8—MgO, 20.7—SiO₂, 9.5—Ca₃(PO₄)₂* | 400 | 410 | 46 | 30 | 10 | |

*S. D. A. 29 (100 volumes of 95% ethyl alcohol +1 volume of acetaldehyde) used as feed.

It is evident from an examination of the table that the process of our invention achieves greater conversion and selectivity than processes employing magnesia-silica catalysts.

In the following claims the expression "improved catalytic conversion characteristics" is to be construed as meaning superior catalytic conversion characteristics for catalyzing the direct conversion of ethyl alcohol to butadiene when compared with a catalyst consisting of magnesia and silica.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described our invention, we claim:

1. A process for the direct catalytic conversion of ethyl alcohol to butadiene comprising contacting ethyl alcohol at an elevated temperature with a catalyst comprising a major weight percentage of magnesia and silica and a minor weight percentage, sufficient to confer improved catalytic conversion characteristics for catalyzing the direct conversion of ethyl alcohol to butadiene, of a phosphate of calcium.

2. A process for the direct catalytic conversion of ethyl alcohol to butadiene comprising contacting ethyl alcohol at an elevated temperature with a catalyst comprising a major weight percentage of magnesia and silica and a minor weight percentage, sufficient to confer improved catalytic conversion characteristics for catalyzing the direct conversion of ethyl alcohol to butadiene, of dibasic calcium phosphate.

3. A process for the direct catalytic conversion of ethyl alcohol to butadiene comprising contacting ethyl alcohol at an elevated temperature with a catalyst comprising a major weight percentage of magnesia and silica and a minor weight percentage, sufficient to confer improved catalytic conversion characteristics for catalyzing the direct conversion of ethyl alcohol to butadiene, of tricalcium phosphate.

4. A process for the direct catalytic conversion of ethyl alcohol to butadiene comprising contacting ethyl alcohol at an elevated temperature with a catalyst comprising a major weight percentage of magnesia and silica and a minor weight percentage, sufficient to confer improved catalytic conversion characteristics for catalyzing the direct conversion of ethyl alcohol to butadiene, of a phosphate of calcium, selected from the group consisting of dibasic calcium phosphate and tricalcium phosphate.

5. A process for the direct catalytic conversion of ethyl alcohol to butadiene comprising contacting ethyl alcohol at 350–450° C. with a catalyst comprising a major weight percentage of magnesia and silica, said magnesia being present in a greater weight percentage than said silica, and a minor weight percentage, sufficient to confer improved catalytic conversion characteristics for catalyzing the direct conversion of ethyl alcohol to butadiene, of a calcium phosphate.

6. A process for the direct catalytic conversion of ethyl alcohol to butadiene comprising contacting 35–50 weight percent ethyl alcohol at 350–450° C. with a catalyst comprising a major weight percentage of magnesia and silica, said magnesia being present in a greater weight percentage than said silica, and a minor weight percentage, sufficient to confer improved catalytic conversion characteristics for catalyzing the direct conversion of ethyl alcohol to butadiene, of dibasic calcium phosphate.

7. A process for the direct catalytic conversion of ethyl alcohol to butadiene comprising contacting ethyl alcohol at 350–450° C. with a catalyst comprising a major weight percentage of magnesia and silica, said magnesia being present in a greater weight percentage than said silica, and a minor weight percentage, sufficient to confer improved catalytic conversion characteristics for catalyzing the direct conversion of ethyl alcohol to butadiene, of tricalcium phosphate.

8. A process for the direct catalytic conversion of ethyl alchol to butadiene comprising contacting ethyl alcohol at 350–450° C. with a catalyst comprising a major weight percent of magnesia and silica, said magnesia being present in a greater weight percentage than said silica, and a minor weight percentage, sufficient to confer improved catalytic conversion characteristics for catalyzing the direct conversion of ethyl alcohol to butadiene, of a phosphate of calcium selected from the class consisting of dibasic calcium phosphate and tricalcium phosphate.

9. A process for the direct catalytic conversion of ethyl alcohol to butadiene comprising contacting ethyl alcohol at 350–450° C. with a catalyst comprising about 65–99 weight percent of magnesia and silica and about 1–35 weight percent of dibasic calcium phosphate.

10. A process for the direct catalytic conversion of ethyl alcohol to butadiene comprising contacting ethyl alcohol at 350–450° C. with a catalyst comprising about 65–99 weight percent of magnesia and silica and about 1–35 weight percent of tricalcium phosphate.

11. A process for the direct conversion of ethyl alcohol to butadiene comprising contacting ethyl alcohol at 350–450° C. with a catalyst comprising about 65–99 weight percent of magnesia and silica and about 1–35 weight percent of a phosphate of calcium selected from the class consisting of dibasic calcium phosphate and tricalcium phosphate.

12. A process for the direct catalytic conversion of ethyl alcohol to butadiene comprising contacting ethyl alcohol at 350–450° C. with a catalyst comprising about 65–99 weight percent of magnesia and silica and about 1–35 weight percent of a calcium phosphate.

References Cited in the file of this patent

UNITED STATES PATENTS

| | | |
|---|---|---|
| 2,204,157 | Semon | July 11, 1940 |
| 2,423,681 | Butterbaugh et al. | July 8, 1947 |
| 2,423,951 | Spence et al. | July 15, 1947 |
| 2,470,190 | Schmerling | May 17, 1949 |
| 2,502,432 | Copenhaver et al. | Apr. 4, 1950 |